United States Patent
Chang

(10) Patent No.: US 8,831,229 B2
(45) Date of Patent: Sep. 9, 2014

(54) KEY TRANSPORT METHOD, MEMORY CONTROLLER AND MEMORY STORAGE APPARATUS

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 326 days.

(21) Appl. No.: 13/309,545

(22) Filed: Dec. 1, 2011

(65) Prior Publication Data
US 2013/0044881 A1 Feb. 21, 2013

(30) Foreign Application Priority Data
Aug. 15, 2011 (TW) .............................. 100129095 A

(51) Int. Cl.
*H04L 9/08* (2006.01)

(52) U.S. Cl.
CPC ............ *H04L 9/0819* (2013.01); *H04L 2209/08* (2013.01); *H04L 2209/12* (2013.01)
USPC ............... 380/286; 380/283; 711/3; 711/113; 711/137; 711/217

(58) Field of Classification Search
CPC ............ G06F 12/0868; G06F 12/1425; G06F 12/0802; G06F 13/1668; G06F 13/37; G06F 12/126; G06F 12/0862; H04L 9/08
USPC .............. 380/283, 286; 711/3, 113, 133, 137, 711/217
See application file for complete search history.

(56) References Cited

U.S. PATENT DOCUMENTS 6,092,149 A * 7/2000 Hicken et al. ................. 711/113

* cited by examiner

*Primary Examiner* — Eleni Shiferaw
*Assistant Examiner* — Paul Callahan
(74) *Attorney, Agent, or Firm* — Jianq Chyun IP Office

(57) ABSTRACT

A key transport method for transporting a key from a buffer memory to an encryption/decryption unit is provided. The method includes logically dividing bits of the key into key segments, wherein each of the key segments has a start position and a segment length. The method also includes setting a transmission length belonging to each of key segments based on the start positions and the segment lengths of the key segments; assigning a transmission bit stream belonging to each of the key segments from the bits of the key according to the start positions and the transmission lengths of the key segments; determining a transmission sequence; and sending the start position, the segment length and the transmission bit stream belonging to each of the key segments to the encryption/decryption unit from the buffer memory based on the transmission sequence. Accordingly, the method can transport the key safely.

25 Claims, 14 Drawing Sheets

| key segment | start position | segment length | transmission length | transmission bit stream | transmission sequence |
|---|---|---|---|---|---|
| 501 | 1 | 4 | 4 | 1010 | 1 |
| 502 | 5 | 4 | 4 | 1000 | 2 |
| 503 | 9 | 4 | 4 | 0101 | 3 |
| 504 | 13 | 4 | 4 | 0111 | 4 |

| key segment | start position | segment length | transmission length | transmission bit stream | transmission sequence |
|---|---|---|---|---|---|
| 701 | 1 | 5 | 5 | 10101 | 1 |
| 702 | 6 | 3 | 3 | 000 | 2 |
| 703 | 9 | 6 | 6 | 010101 | 3 |
| 704 | 15 | 2 | 2 | 11 | 4 |

| key segment | start position | segment length | transmission length | transmission bit stream | transmission sequence |
|---|---|---|---|---|---|
| 901 | 1 | 5 | 5 | 10101 | 3 |
| 902 | 6 | 3 | 3 | 000 | 1 |
| 903 | 9 | 6 | 6 | 010101 | 4 |
| 904 | 15 | 2 | 2 | 11 | 2 |

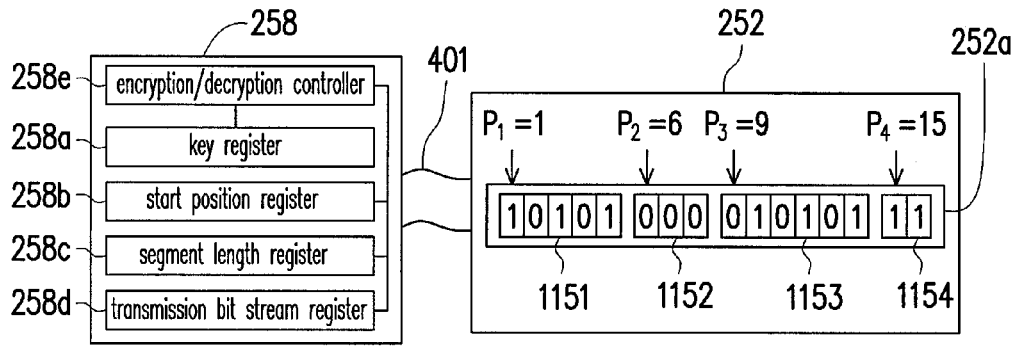
FIG. 11A
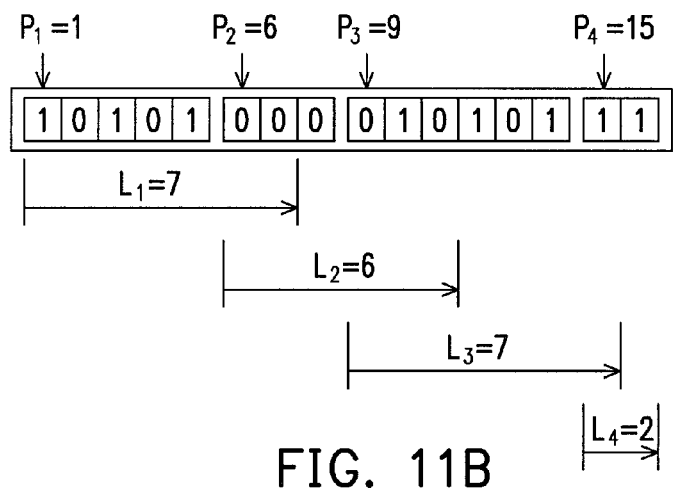
FIG. 11B
| key segment | start position | segment length | transmission length | transmission bit stream | transmission sequence |
|---|---|---|---|---|---|
| 1151 | 1 | 5 | 7 | 1010100 | 3 |
| 1152 | 6 | 3 | 6 | 000010 | 1 |
| 1153 | 9 | 6 | 7 | 0101011 | 4 |
| 1154 | 15 | 2 | 2 | 11 | 2 |
FIG. 11C

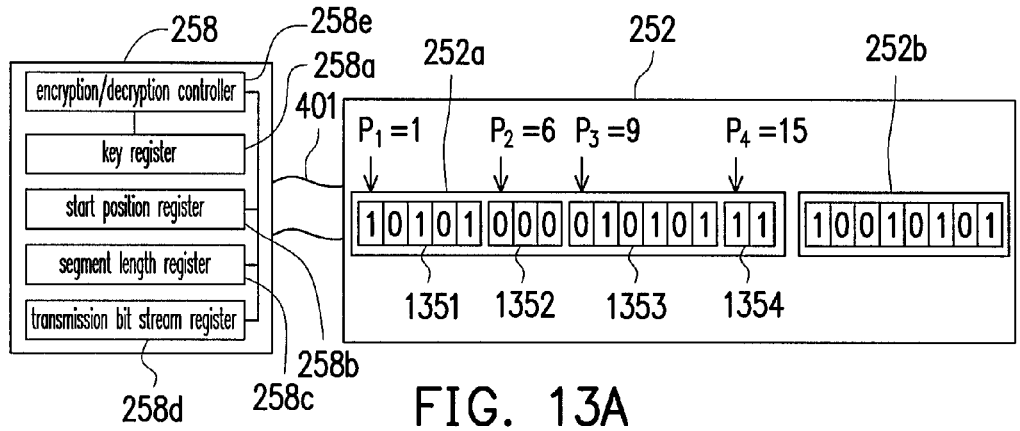
FIG. 13A
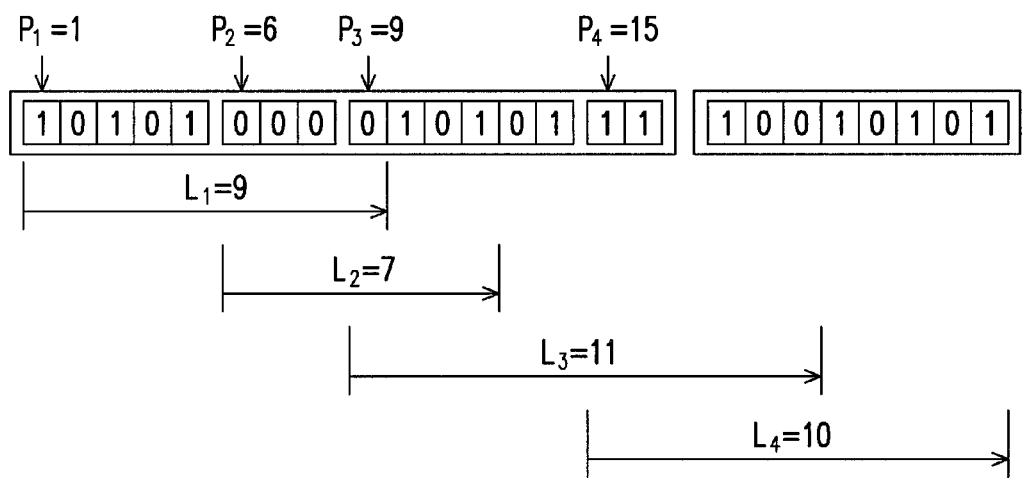
FIG. 13B
| key segment | start position | segment length | transmission length | transmission bit stream | transmission sequence |
|---|---|---|---|---|---|
| 1351 | 1 | 5 | 9 | 101010000 | 3 |
| 1352 | 6 | 3 | 7 | 0000101 | 1 |
| 1353 | 9 | 6 | 11 | 01010111100 | 4 |
| 1354 | 15 | 2 | 10 | 1110010101 | 2 |
FIG. 13C

KEY TRANSPORT METHOD, MEMORY CONTROLLER AND MEMORY STORAGE APPARATUS

CROSS-REFERENCE TO RELATED APPLICATION

This application claims the priority benefit of Taiwan application serial no. 100129095, filed on Aug. 15, 2011. The entirety of the above-mentioned patent application is hereby incorporated by reference herein and made a part of this specification.

BACKGROUND

1. Technology Field

The present invention relates to a key transport method. Particularly, the present invention relates to a method for transporting a key from a buffer memory to an encryption/decryption unit through a bus, and a memory controller and a memory storage apparatus using the same.

2. Description of Related Art

Digital cameras, cell phones, and MP3 players have undergone rapid growth in recent years, so that consumer demands for storage media have also rapidly increased. A rewritable non-volatile memory is one of the most adaptable memories for portable electronic products, for example, mobile phones, personal digital assistants and notebook computes, etc. due to its characteristics such as data non-volatility, low power consumption, small volume, non-mechanical structure, and high read-and-write speed. Thus, in recent years, the flash memory industry has become a major part of the electronic industry. The rewritable non-volatile memories have been broadly applied to personal data storage due to its small volume, large capacity, and high portability. However, the data stored in a rewritable non-volatile memory apparatus may be stolen when the rewritable non-volatile memory apparatus is lost. In order to resolve such problem, an encryption/decryption unit is generally added to the rewritable non-volatile memory apparatus to prevent data from being arbitrarily read or stolen.

Generally, before an encryption/decryption algorithm (for example, an advanced encryption standard (AES) and a data encryption standard (DES), etc.) is used, one to three keys have to be first input. Conventionally, in hardware implementation, all keys are generally written into a register of the encryption/decryption unit altogether. However, in view of a data bus or a side channel, the keys have a risk to be recorded stealthily by a hacker. FIG. 1 is a schematic diagram of key transportation according to a conventional technique. Referring to FIG. 1, before an encryption/decryption unit 1 is used, a key 252a has to be transported from a buffer memory 252 to a key register 1a of the encryption/decryption unit 1. Generally, according to the conventional technique, the key 252a is altogether written into the key register 1a of the encryption/decryption unit 1, so that a content of the key 252a is uninterruptedly appeared on a data bus 401. Therefore, during a period when the key 252a is transported, a hacker can obtain the content of the key by probing the data bus 401 or measuring energy variation or power loss, etc. Therefore, a secure and reliable key transport method is required to be developed.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a key transport method, a memory controller and a memory storage apparatus, which can safely transport keys from a buffer memory to an encryption/decryption unit.

An exemplary embodiment of the present invention provides a key transport method for transporting a key stored in a buffer memory to an encryption/decryption unit through a data bus. The method includes logically dividing a plurality of bits of the key into a plurality of key segments, where each of the key segments has a start position and a segment length. The method also includes setting a transmission length corresponding to each of the key segments according to the segment lengths of the key segments; assigning a transmission bit stream belonging to each of the key segments from the bits of the key according to the start positions and the transmission lengths of the key segments; determining a transmission sequence of the key segments; and sending the start position, the segment length and the transmission bit stream belonging to each of the key segments from the buffer memory to the encryption/decryption unit through the data bus according to the transmission sequence.

An exemplary embodiment of the present invention provides a memory controller for controlling a rewritable non-volatile memory module. The memory controller includes a host interface, a memory interface, a buffer memory, an encryption/decryption unit and a memory management circuit. The host interface is coupled to a host system. The memory interface is coupled to the rewritable non-volatile memory module. The buffer memory is configured for temporarily storing a key. The encryption/decryption unit encrypts/decrypts data according to the key. The memory management circuit is coupled to the host interface and the memory interface, and is configured for transporting the key from the buffer memory to the encryption/decryption unit through a data bus. The memory management circuit logically divides bits of the key into a plurality of key segments, where each of the key segments has a start position and a segment length. Moreover, the memory management circuit sets a transmission length corresponding to each of the key segments according to the segment lengths of the key segments, and assigns a transmission bit stream belonging to each of the key segments from the bits of the key according to the start positions and the transmission lengths of the key segments. Moreover, the memory management circuit determines a transmission sequence of the key segments, and sends the start position, the segment length and the transmission bit stream belonging to each of the key segments from the buffer memory to the encryption/decryption unit through the data bus according to the transmission sequence.

An exemplary embodiment of the invention provides a memory storage apparatus including a connector, a rewritable non-volatile memory module and the aforementioned memory controller. The connector is coupled to a host system. The rewritable non-volatile memory module is configured for storing data. The memory controller is coupled to the connector and the rewritable non-volatile memory module.

According to the above descriptions, the key transport method, the memory controller and the memory storage apparatus of the present invention can prevent the key from being stolen during the process of transporting the key from the buffer memory to the encryption/decryption unit.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 11A is a schematic diagram of a key transport method according to a fourth exemplary embodiment of the present invention.

FIG. 11B is a schematic diagram of determining a transmission length of each key segment shown in FIG. 11A.

FIG. 11C is a related information list of a plurality of key segments obtained by logically dividing a key shown in FIG. 11A.

FIG. 13A is a schematic diagram of a key transport method according to a fifth exemplary embodiment of the present invention.

FIG. 13B is a schematic diagram of determining transmission lengths of key segments shown in FIG. 13A.

FIG. 13C is a related information list of a plurality of key segments obtained by logically dividing a key shown in FIG. 13A.

DETAILED DESCRIPTION OF DISCLOSED EMBODIMENTS

Figure 1:
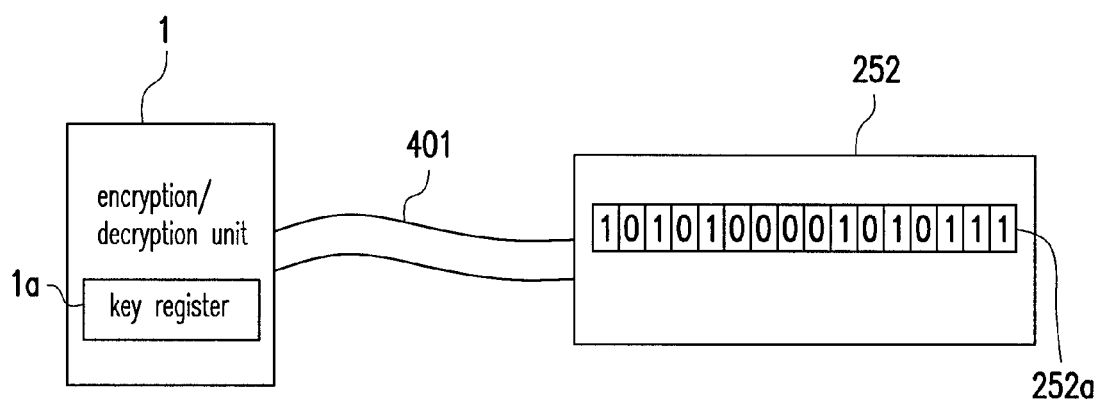
FIG. 1 is a schematic diagram of key transportation according to a conventional technique.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

Generally, a memory storage apparatus (which is also referred to as a memory storage system) includes a rewritable non-volatile memory module and a controller (which is also referred to as a control circuit). The memory storage device is generally used together with a host system, so that the host system can write data into the memory storage apparatus or read data from the memory storage apparatus.

Figure 2A:
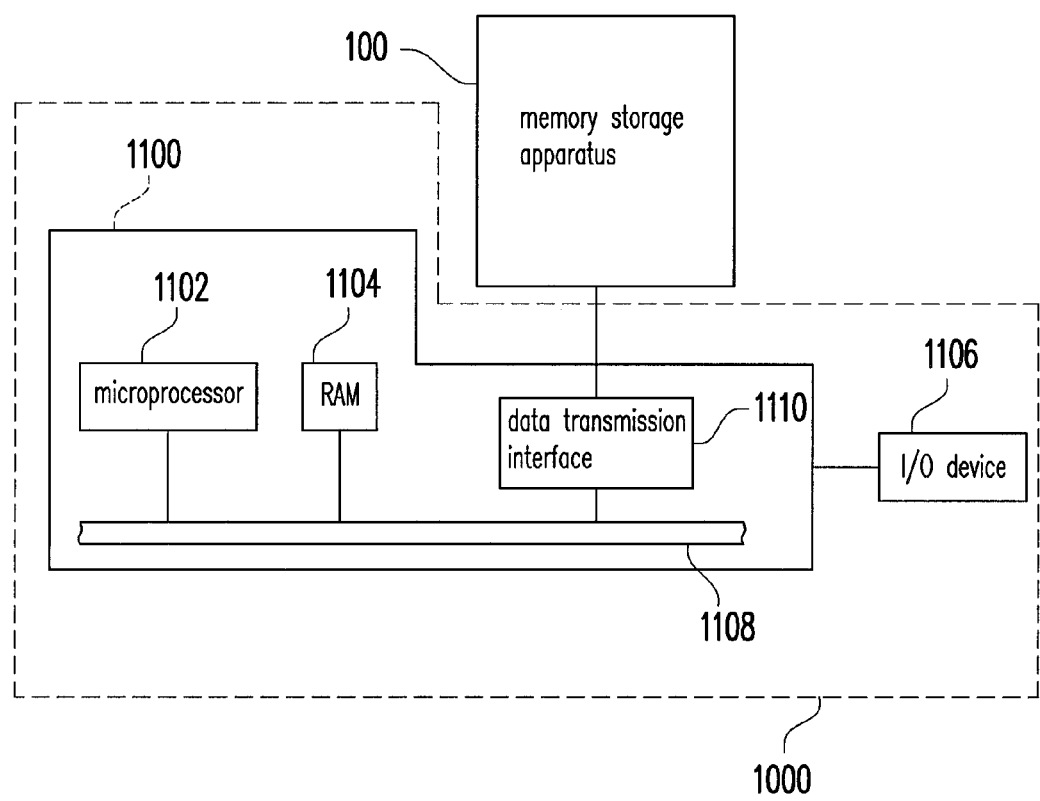
FIG. 2A is a schematic diagram illustrating a host system and a memory storage apparatus according to an exemplary embodiment of the present invention.

FIG. 2A is a schematic diagram illustrating a host system and a memory storage apparatus according to an exemplary embodiment of the present invention.

Figure 2B:
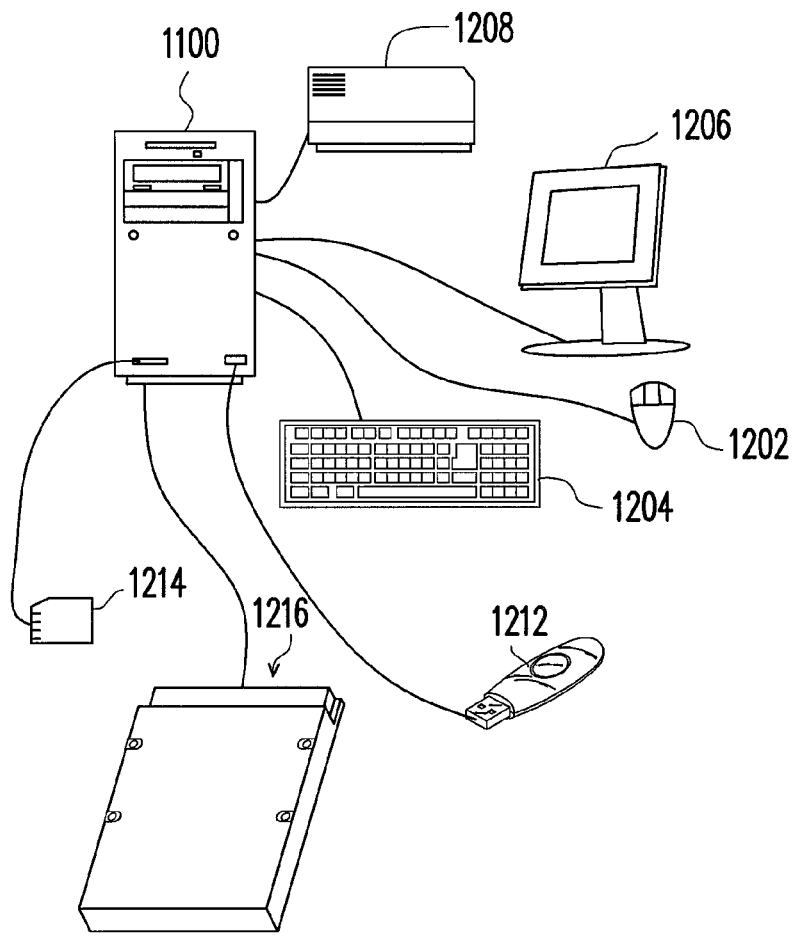
FIG. 2B is a schematic diagram illustrating a computer, input/output devices and a memory storage apparatus according to an exemplary embodiment of the present invention.

Referring to FIG. 2A, the host system 1000 generally includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 shown in FIG. 2B. It should be noticed that the devices shown in FIG. 2B are not used to limit to the I/O device 1106, and the I/O device 1106 may also include other devices.

In the present embodiment, the memory storage apparatus 100 is coupled to the other devices of the host system 1000 through the data transmission interface 1110. Based on operations of the microprocessor 1102, the RAM 1104, and the I/O device 1106, the host system 1000 may write data into the memory storage apparatus 100 or read data from the memory storage apparatus 100. For example, the memory storage apparatus 100 may be a rewritable non-volatile memory storage apparatus such as a flash drive 1212, a memory card 1214 or a solid state drive (SSD) 1216 shown in FIG. 2B.

Figure 2C:
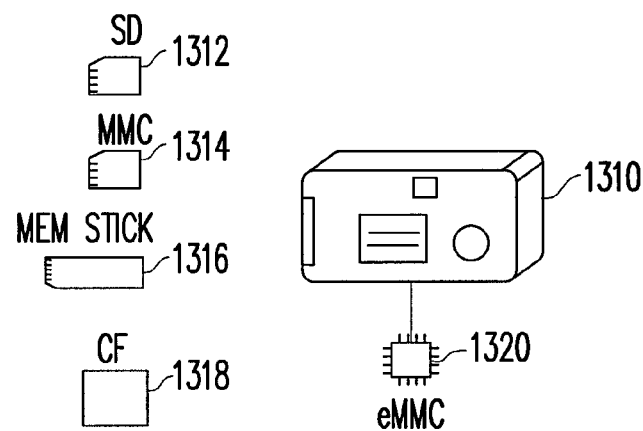
FIG. 2C is a schematic diagram illustrating a host system and a memory storage apparatus according to an exemplary embodiment of the present invention.

Generally, the host system 1000 can be any system capable of operating in collaboration with the memory storage apparatus 100 to store data. In the present exemplary embodiment, although the host system 1000 implemented by a computer system is taken as an example, in another exemplary embodiment of the present invention, the host system 1000 can also be a digital camera, a video camera, a communication device, an audio player or a video player, etc. For example, when the host system is a digital camera (video camera) 1310, the rewritable non-volatile memory storage apparatus is a secure digital (SD) card 1312, a multimedia card (MMC) card 1314, a memory stick (MS) 1316, a compact flash (CF) card 1318 or an embedded storage device 1320 (shown in FIG. 2C). The embedded storage device 1320 includes an embedded MMC (eMMC). It should be noticed that the embedded eMMC is directly coupled to a substrate of the host system.

Figure 3:
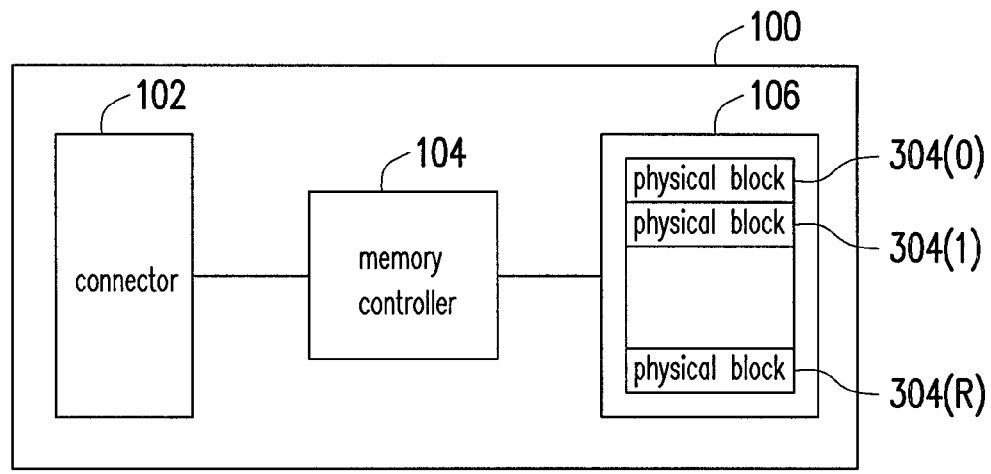
FIG. 3 is a schematic block diagram of the memory storage apparatus of FIG. 2A.

FIG. 3 is a schematic block diagram of the memory storage apparatus of FIG. 2A.

Referring to FIG. 3, the memory storage apparatus 100 includes a connector 102, a memory controller 104 and a rewritable non-volatile memory module 106.

In the present exemplary embodiment, the connector 102 complies with a serial advanced technology attachment (SATA) standard, though the present invention is not limited thereto, and the connector 102 may complies with an institute of electrical and electronic engineers (IEEE) 1394 standard, a parallel advanced technology attachment (PATA) standard, a peripheral component interconnect express (PCI express) interface standard, a universal serial bus (USB) standard, a secure digital (SD) interface standard, a memory stick (MS) interface standard, a MMC interface standard, a compact flash (CF) interface standard, an integrated drive electronics (IDE) standard or other suitable standards.

The memory controller 104 may execute a plurality of logic gates or control instructions implemented by a hardware form or a firmware form, and may perform a program operation, a read operation or an erase operation on the rewritable non-volatile memory module 106 according to operation commands of the host system 1000.

The rewritable non-volatile memory module 106 is coupled to the memory controller 104, and is configured for storing data written by the host system 1000. The rewritable non-volatile memory module 106 includes physical blocks 304(0)-304(R), and each physical block includes a plurality of physical pages, wherein the physical pages belonging to the same physical block can be independently programmed, and must be simultaneously erased. To be specific, physical block is the smallest unit for erasing data. Namely, each physical block contains the least number of memory cells that are erased all together. Physical page is the smallest unit for programming data. Namely, physical page is the smallest unit for writing data. In the present exemplary embodiment, the rewritable non-volatile memory module 106 is a multi level cell (MLC) NAND flash memory chip. However, the present invention is not limited thereto, and the rewritable non-volatile memory module 106 may also be a single level cell (SLC) NAND flash memory chip, other flash memory modules or other memory modules having the same characteristic.

Figure 4:
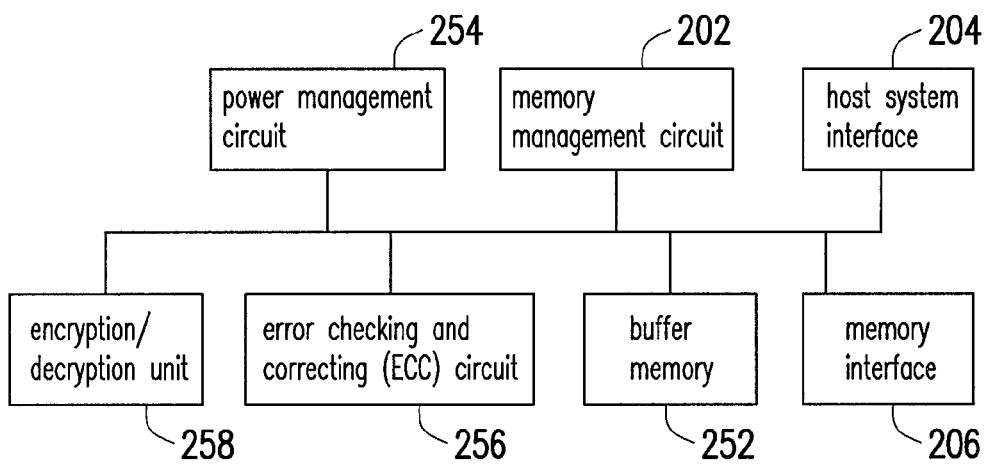
FIG. 4 is a schematic block diagram of a memory controller according to an exemplary embodiment of the invention.

FIG. 4 is a schematic block diagram of a memory controller according to an exemplary embodiment of the present invention.

Referring to FIG. 4, the memory controller 104 includes a memory management circuit 202, a host interface 204 and a memory interface 206.

The memory management circuit 202 is configured for controlling a whole operation of the memory controller 104. In detail, the memory management circuit 202 has a plurality of control instructions, and when the memory storage apparatus 100 is in operation, the control instructions are executed to implement operations such as data programming, data reading and data erasing, etc.

In detail, the control instructions of the memory management circuit 202 are stored in a specific area of the rewritable non-volatile memory module 106 (for example, a system area used for storing system data in the rewritable non-volatile memory module 106) in form of program codes. Moreover, the memory management circuit 202 has a micro processing unit (not shown), a read-only memory (not shown) and a random access memory (not shown). Particularly, the read-only memory has boot codes, and when the memory controller 104 is enabled, the micro processing unit executes the boot codes to load the control instructions stored in the rewritable non-volatile memory module 106 into the random access memory of the memory management circuit 202. Then, the micro processing unit executes the control instructions to execute the data writing, reading and erasing operations, etc. Moreover, in another exemplary embodiment of the present invention, the control instructions of the memory management circuit 202 may be implemented by a hardware form.

The host interface 204 is coupled to the memory management circuit 202 and is configured for receiving and identifying commands and data transmitted by the host system 1000. Namely, the commands and data transmitted by the host system 1000 are transmitted to the memory management circuit 202 through the host interface 204. In the present exemplary embodiment, the host interface 204 complies with the SATA standard. However, the present invention is not limited thereto, and in other exemplary embodiments, the host interface 204 may complies with the PATA standard, the IEEE 1394 standard, the PCI express standard, the USB standard, the SD standard, the MS standard, the MMC standard, the CF standard, the IDE standard or other suitable data transmission standards.

The memory interface 206 is coupled to the memory management circuit 202 and is configured for accessing the rewritable non-volatile memory module 106. Namely, data to be written into the rewritable non-volatile memory module 106 is converted into a format that can be accepted by the rewritable non-volatile memory module 106 through the memory interface 206.

In an exemplary embodiment of the present invention, the memory controller 104 further includes a buffer memory 252. The buffer memory 252 is coupled to the memory management circuit 202, and is configured for temporarily storing data and commands from the host system 1000 or data from the rewritable non-volatile memory module 106. Particularly, before an encryption/decryption unit 258 starts to operate, the memory management circuit 202 transports a key from the buffer memory 252 to the encryption/decryption unit 258 according to the key transport method of the present exemplary embodiment.

In an exemplary embodiment of the present invention, the memory controller 104 further includes a power management circuit 254. The power management circuit 254 is coupled to the memory management circuit 202 and is configured for controlling the power of the memory storage apparatus 100.

In an exemplary embodiment of the present invention, the memory controller 104 further includes an error checking and correcting (ECC) circuit 256. The ECC circuit 256 is coupled to the memory management circuit 202 and is configured to execute an error checking and correcting procedure to ensure correctness of data. In detail, when the memory management circuit 202 receives a write command from the host system 1000, the ECC circuit 256 generates a corresponding error checking and correcting code (ECC code) for data corresponding to the write command, and the memory management circuit 202 writes the data corresponding to the write command and the corresponding ECC code together to the rewritable non-volatile memory module 106. Then, when the memory management circuit 202 reads data from the rewritable non-volatile memory module 106, it simultaneously reads the ECC code corresponding to the data, and the ECC circuit 256 executes the error checking and correcting procedure on the read data according to the ECC code.

In an exemplary embodiment of the present invention, the memory controller 104 further includes the encryption/decryption unit 258. The encryption/decryption unit 258 is coupled to the memory management circuit 202, and is configured for encrypting data to be written into the rewritable non-volatile memory module 106 according to the key, and decrypting data read from the rewritable non-volatile memory module 106.

In the exemplary embodiment, an encryption/decryption function in the encryption/decryption unit 258 may be implemented by an advanced encryption standard (AES) or a data encryption standard (DES).

In the present exemplary embodiment, before the encryption/decryption unit 258 encrypts data, the memory management circuit 202 divides a key temporarily stored in the buffer memory 252 into a plurality of key segments, and transport the divided key segments and the related information to the encryption/decryption unit 258 through a data bus.

Figures 5A, 5B:
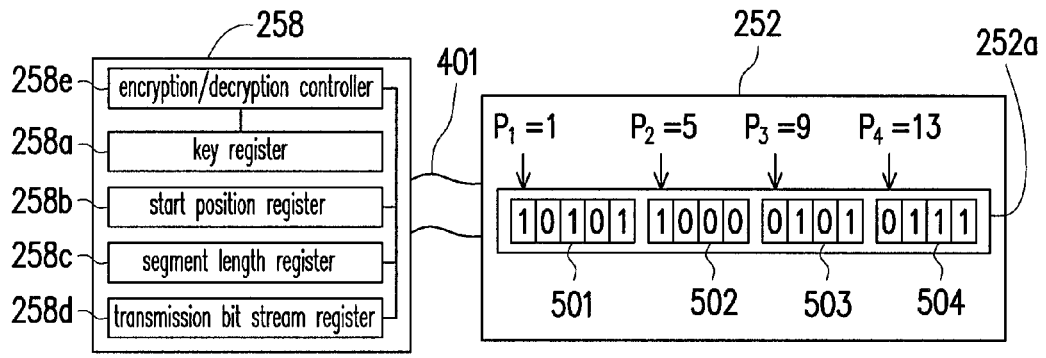
FIG. 5A is a schematic diagram of a key transport method according to a first exemplary embodiment of the invention.
FIG. 5B is a related information list of a plurality of key segments obtained by logically dividing a key shown in FIG. 5A.

FIG. 5A is a schematic diagram of a key transport method according to the first exemplary embodiment of the present invention, and FIG. 5B is a related information list of a plurality of key segments obtained by logically dividing a key shown in FIG. 5A. In order to simplify the key transport method, it is assumed that the key 252a only has 16 bits, though it should be noticed that the invention is not limited thereto.

As shown in FIG. 5A, in the exemplary embodiment, the memory management circuit 202 sequentially divides the key 252a into the key segments 501-504, wherein each of the key segments has attributes of a start position and a segment length for recording the start position and the length of the key segment in the key.

As shown in FIG. 5B, in the related information list of the key segments, a first column records referential numbers of the key segments, a second column records the start positions of the key segments (a start bit of each key segment in the key), a third column records segment lengths of the key segments (the number of bits of each key segment), a fourth column records transmission lengths of the key segments, a fifth column records transmission bit streams of the key segments, and a sixth column records a transmission sequence of the key segments to be transmitted to the encryption/decryption unit 258. Herein, the transmission length represents data length of each key segment transmitted in the data bus 401, and the transmission bit stream represents data content of each key segment transmitted in the data bus 401.

Referring to FIG. 5A, the encryption/decryption unit 258 includes a key register 258a, a start position register 258b, a segment length register 258c, a transmission bit stream register 258d and an encryption/decryption controller 258e. Herein, the key register 258a is used for storing the key 252a finally obtained by the encryption/decryption unit 258, the start position register 258b is use for storing the start position of each key segment, the segment length register 258c is used for storing the segment length of each key segment, and the transmission bit stream register 258d is used for storing the transmission bit stream of each key segment.

During the key transport process, the memory management circuit 202 respectively writes the start positions, the segment lengths and the transmission bit streams of the key segments 501-504 into the start position register 258b, the segment length register 258c and the transmission bit stream register 258d. After the key transport is completed, the encryption/decryption unit 258 restores the original key 252a according to the contents stored in the three registers, and stores the restored key 252a into the key register 258a.

Referring to FIG. 5A and FIG. 5B, in detail, the key 252a is temporarily stored in the buffer memory 252 before it is transmitted to the encryption/decryption unit 258. Then, the memory management circuit 202 logically divides the 16 bits of the key 252a into the key segments 501-504 by a fixed length (4 bits), and respectively calculates the corresponding start position and the segment length for each of the key segments. The start positions P1-P4 of the key segments 501-504 are respectively 1, 5, 9 and 13, and the segment lengths of the key segments 501-504 are all 4 (shown in the third column of FIG. 5B).

Then, the memory management circuit 202 sets a transmission length corresponding to each of the key segments according to the segment lengths of the key segments. Herein, the transmission length corresponding to each key segment is not less than the segment length of such key segment. In the first exemplary embodiment, the memory management circuit 202 takes the segment length of the key segment as the corresponding transmission length. In other words, the transmission lengths of the key segments 501-504 are all 4 (shown in the fourth column of FIG. 5B).

Then, the memory management circuit 202 assigns a transmission bit stream of each of the key segments from the key 252a in the buffer memory 252 according to the start positions and the transmission lengths of the key segments. In detail, the memory management circuit 202 reads four bit values (i.e., '1010') from the start position of the key segment 501 to serve as the transmission bit stream of the key segment 501, reads four bit values (i.e., '1000') from the start position of the key segment 502 to serve as the transmission bit stream of the key segment 502, reads four bit values (i.e., '0101') from the start position of the key segment 503 to serve as the transmission bit stream of the key segment 503, and reads four bit values (i.e., '0111') from the start position of the key segment 504 to serve as the transmission bit stream of the key segment 504 (shown in the fifth column of FIG. 5B).

Then, the memory management circuit 202 determines a transmission sequence of the key segments, and sends the start position, the segment length and the transmission bit stream of each of the key segments to the start position register 258b, the segment length register 258c and the transmission bit stream register 258d of the encryption/decryption unit 258 according to the transmission sequence. In the present exemplary embodiment, the memory management circuit 202 takes a sequence of the key segments in the key 252a as the transmission sequence. In other words, the transmission sequence of the key segments is the key segment 501, the key segment 502, the key segment 503 and the key segment 504.

Finally, after the key transportation is completed, the encryption/decryption controller 258e of the encryption/decryption unit 258 recombines the start positions, the segment lengths and the transmission bit streams of the key segments to obtain the key.

Therefore, during the key transport process, the contents (i.e., the transmission bit streams) of the key segments are interweaved with the start positions and the segment lengths of the key segments, so that the content of the key is not uninterruptedly appeared on the data bus. In this way, a situation that the hacker easily obtains the content of the key by directly probing the data bus or measuring energy variation is avoided.

It should be noticed that in the present exemplary embodiment, the length of the key 252a is 16 bits. However, the present invention is not limited thereto, and in another exemplary embodiment, the length of the key 252a can also be 64, 128 or 256 bits, etc. In principle, the length of the key is determined by the used encryption/decryption standard.

Moreover, in the present exemplary embodiment, the memory management circuit 202 logically divides the key 252a into four key segments. However, it should be noticed that the memory management circuit 202 may also logically divide the key 252a into more or less key segments.

Figure 6:
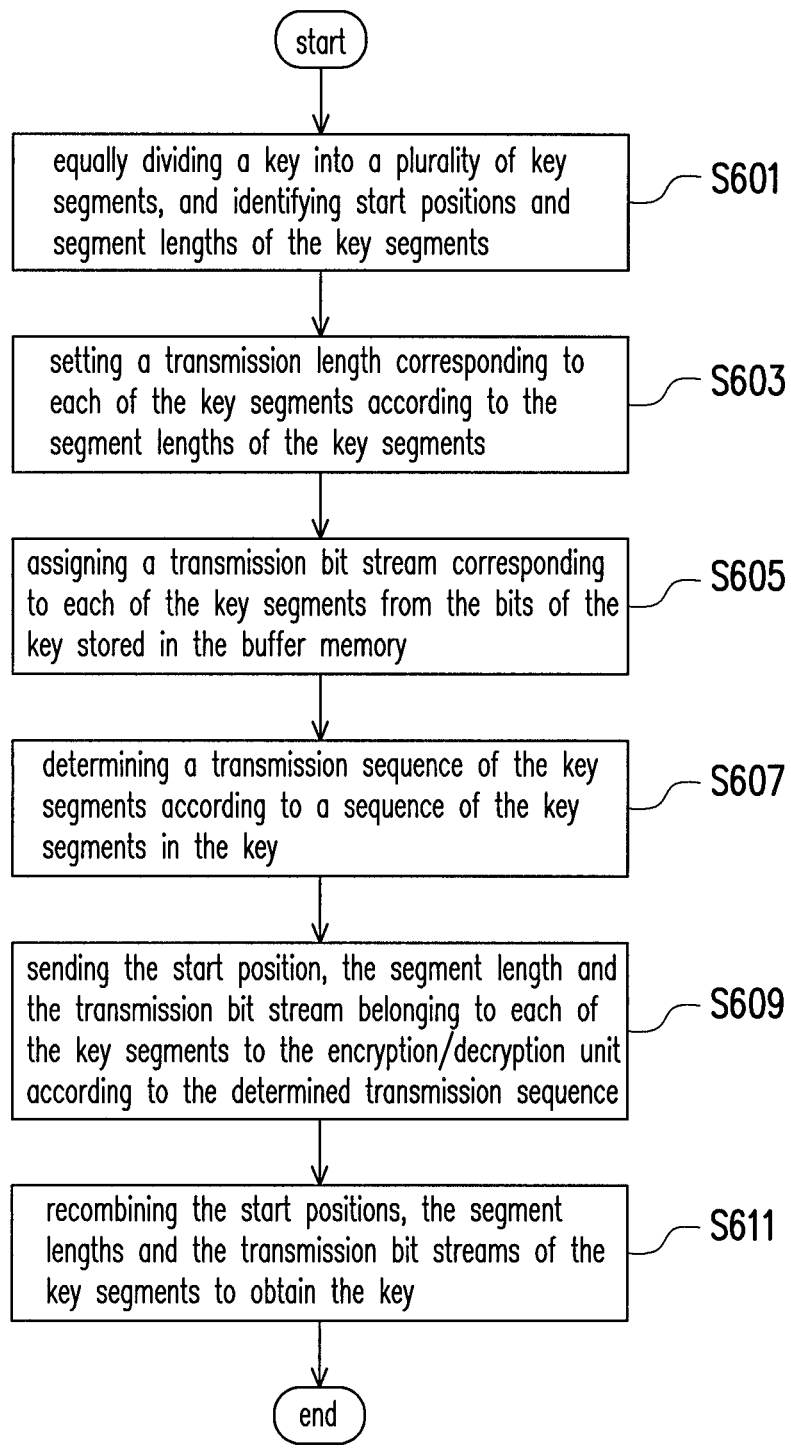
FIG. 6 is a flowchart illustrating a key transport method according to the first exemplary embodiment of the invention.

FIG. 6 is a flowchart illustrating a key transport method according to the first exemplary embodiment of the invention.

Referring to FIG. 6, first, in step S601, the memory management circuit 202 equally divides a key into a plurality of key segments (for example, four key segments respectively having a length of 4 bits), and identifies start positions (for example, the start positions of the four key segments are respectively 1, 5, 9 and 13) and segment lengths (for example, the lengths of the four key segments are all 4) of the key segments. Then, in step S603, the memory management circuit 202 sets a transmission length corresponding to each of the key segments according to the segment lengths of the key segments (for example, the transmission lengths of the four key segments are all 4).

Then, in step S605, the memory management circuit 202 assigns a transmission bit stream of each of the key segments from the bits of the key stored in the buffer memory 252 according to the start positions and the transmission lengths of the key segments.

Then, in step S607, the memory management circuit 202 determines a transmission sequence of the key segments according to a sequence of the key segments in the key. Then, in step S609, the memory management circuit 202 sends the start position, the segment length and the transmission bit stream corresponding to each of the key segments to the encryption/decryption unit 258 according to the transmission sequence determined in the step S607. Particularly, the start position, the segment length and the transmission bit stream of each of the key segments are respectively written into the start position register 258b, the segment length register 258c and the transmission bit stream register 258d.

It should be noticed that during the process of transporting the key segments, the sequence of transporting the start positions, the segment lengths and the transmission bit streams is not specifically defined.

Finally, in step S611, after the start positions, the segment lengths and the transmission bit streams of the key segments are all transmitted to the encryption/decryption unit 258, the encryption/decryption controller 258e recombines the start positions, the segment lengths and the transmission bit streams of the key segments to obtain the key 252a.

Second Exemplary Embodiment

A memory controller and a memory storage apparatus of the second exemplary embodiment are substantially the same to the memory controller and the memory storage apparatus of the first exemplary embodiment, and a difference between the two embodiments is that in the second exemplary embodiment, a different method is used to logically divide a key to be transported. To be specific, in the second exemplary embodiment, a plurality of bits of the key are randomly divided into a plurality of key segments with different segment lengths. Since each key segment has an unfixed segment length, a hacker is hard to obtain the content of the key by directly probing the data bus or measuring the energy variation. The difference of the second exemplary embodiment and the first exemplary embodiment is described below with reference of FIG. 7A and FIG. 7B.

Figures 7A, 7B:
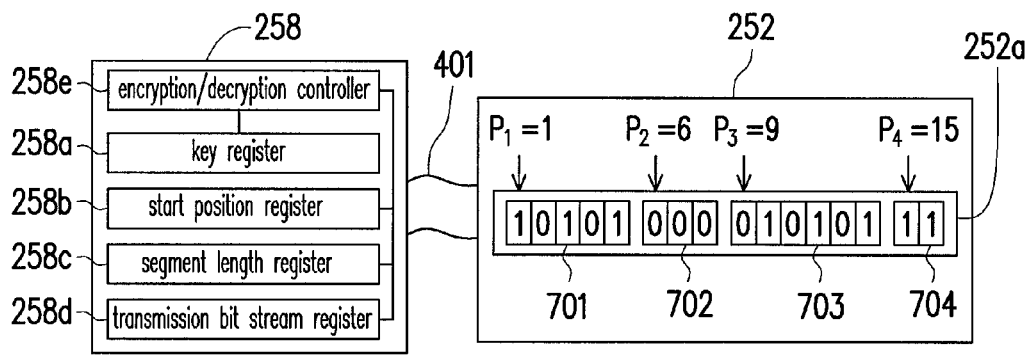
FIG. 7A is a schematic diagram of a key transport method according to a second exemplary embodiment of the invention.
FIG. 7B is a related information list of a plurality of key segments obtained by logically dividing a key shown in FIG. 7A.

FIG. 7A is a schematic diagram of a key transport method according to the second exemplary embodiment of the invention, and FIG. 7B is a related information list of a plurality of key segments obtained by logically dividing a key shown in FIG. 7A. Herein, it is assumed that the length and content of the key 252a are the same to that of the first exemplary embodiment.

Referring to FIG. 7A and FIG. 7B, in detail, the memory management circuit 202 randomly divides the 16 bits of the key 252a into the key segments with different lengths, and identifies the start position and the segment length of each of the key segments. For example, assuming the memory management circuit 202 is about to divide the 16 bits of the key 252a into the key segments 701-704, the memory management circuit 202 first sets the start position of the key segment 701 to 1, and generates three random numbers between 1 to 16 (for example, by using a random number generator), which are used to serve as the start positions of the key segments 702-704 from small to large.

According to FIG. 7A and FIG. 7B, it is known that in the present exemplary embodiment, the start positions P1-P4 of the key segments 701-704 are respectively 1, 6, 9 and 15. Therefore, the memory management circuit 202 identifies the segment lengths of the key segments 701-704 to be 5, 3, 6 and 2 (shown in the third column of FIG. 7B).

Then, the memory management circuit 202 sets a transmission length corresponding to each of the key segments according to the segment lengths of the key segments, wherein the transmission length is not less than the segment length of the corresponding key segment. In the present exemplary embodiment, the memory management circuit 202 takes the segment lengths of the key segments as the transmission lengths. In other words, the transmission lengths of the key segments 701-704 are respectively 5, 3, 6 and 2 (shown in the fourth column of FIG. 7B).

Then, the memory management circuit 202 assigns a transmission bit stream of each of the key segments from the key 252a in the buffer memory 252 according to the start positions and the transmission lengths of the key segments. In detail, the memory management circuit 202 reads five bit values (i.e., '10101') from the start position of the key segment 701 to serve as the transmission bit stream of the key segment 701, reads three bit values (i.e., '000') from the start position of the key segment 702 to serve as the transmission bit stream of the key segment 702, reads six bit values (i.e., '010101') from the start position of the key segment 703 to serve as the transmission bit stream of the key segment 703, and reads two bit values (i.e., '11') from the start position of the key segment 704 to serve as the transmission bit stream of the key segment 704 (shown in the fifth column of FIG. 7B).

Then, the memory management circuit 202 determines a transmission sequence of the key segments, and sends the start position, the segment length and the transmission bit stream of each of the key segments according to the transmission sequence. Methods of determining the transmission sequence and transporting the start position, the segment length and the transmission bit stream of each of the key segments are the same to that of the first exemplary embodiment, which are not repeated herein.

Therefore, during the key transport process, not only the contents of the key segments are interweaved with the start positions and the segment lengths of the key segments, but also the segment lengths of the key segments are random values, so that compared to the first exemplary embodiment, the related contents of the key segments are appeared on the data bus in a more irregular manner. Therefore, a situation that the hacker easily obtains the content of the key by directly probing the data bus or measuring energy variation is avoided.

Figure 8:
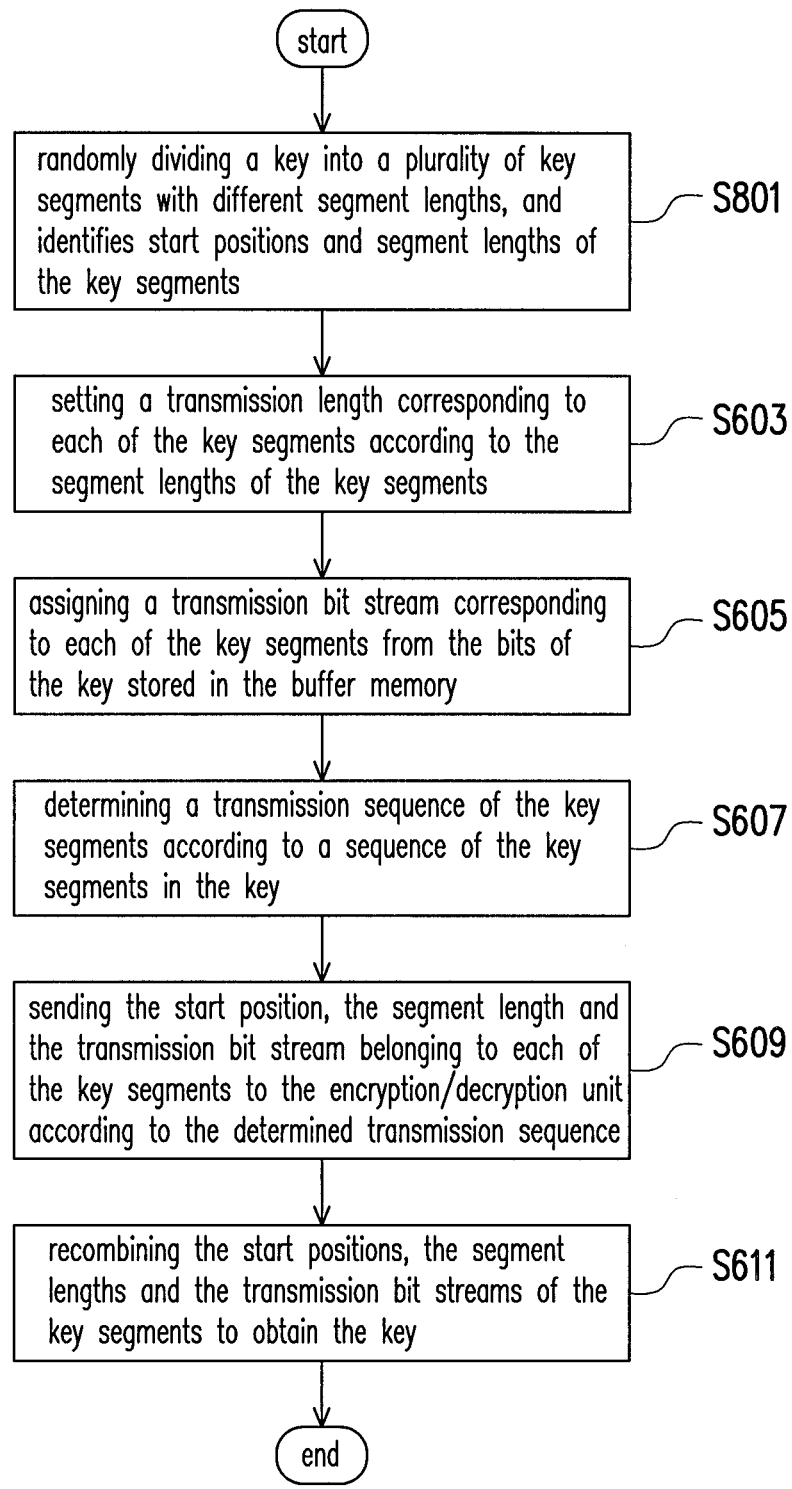
FIG. 8 is a flowchart illustrating a key transport method according to the second exemplary embodiment of the present invention.

FIG. 8 is a flowchart illustrating a key transport method according to the second exemplary embodiment of the invention.

Referring to FIG. 8, besides the step S801, the other steps have been described in the first exemplary embodiment, which are not repeated herein, and only the step S801 is described below.

In the step S801, the memory management circuit 202 randomly divides a key into a plurality of key segments with different segment lengths, and identifies start positions and segment lengths of the key segments. For example, the memory management circuit 202 first sets the start position of the key segment 701 to 1, and generates three random numbers between 1 to 16, which are used to serve as the start positions of the key segments 702-704 from small to large, and then accordingly identifies the segment lengths of the key segments.

However, it should be noticed that the invention is not limited thereto, and in another embodiment of the invention, the random numbers can be first generated to serve as the segment lengths of the key segments, and then the start positions of the key segments are accordingly identified. In detail, four random numbers (for example, 5, 3, 6 and 2) are generated, where a sum of the four random numbers is 16. Then, the start position of the key segment 701 is set to 1, and then the start positions of the key segments 702-704 (which are 6, 9, and 15) are sequentially identified according to the four random numbers.

Third Exemplary Embodiment

A memory controller and a memory storage apparatus of the third exemplary embodiment of the present invention are substantially the same to the memory controller and the memory storage apparatus of the second exemplary embodiment, and a difference between the two embodiments is that in the third exemplary embodiment, a different method is used to determine the transmission sequence of the key segments. To be specific, in the third exemplary embodiment, the transmission sequence of the key segments is random. Therefore, besides unfixed segment lengths, each key segment is appeared on the data bus in an unfixed sequence, so that the third party is harder to obtain the content of the key by directly probing the data bus or measuring the energy variation.

Figures 9A, 9B:
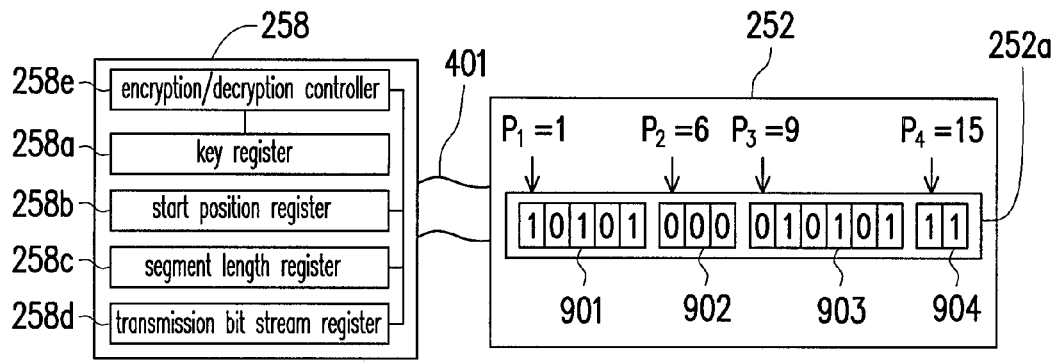
FIG. 9A is a schematic diagram of a key transport method according to a third exemplary embodiment of the present invention.
FIG. 9B is a related information list of a plurality of key segments obtained by logically dividing a key shown in FIG. 9A.

FIG. 9A is a schematic diagram of a key transport method according to the third exemplary embodiment of the invention, and FIG. 9B is a related information list of a plurality of key segments obtained by logically dividing a key shown in FIG. 9A.

Referring to FIG. 9A and FIG. 9B, as described above, similar to the second exemplary embodiment, in the third exemplary embodiment, the key is logically divided into four key segments and the corresponding transmission lengths are set, and details thereof are not repeated. A difference between the two embodiments is that in the third exemplary embodiment, a transmission sequence of key segments 901-904 is random. For example, the memory management circuit 202 may generate four random numbers for the key segments 901-904, and determines the transmission sequence of the key segments 901-904 according to magnitudes of the four random numbers.

According to FIG. 9B, it is known that in the present exemplary embodiment, the transmission sequence of the key segments is the key segment 902, the key segment 904, the key segment 901 and the key segment 903. Then, the memory management circuit 202 transmits the start positions, the segment lengths and the transmission bit streams of the key segments to the encryption/decryption unit 258 according to the transmission sequence.

Therefore, not only the segment lengths of the key segments are random values, but also the transmission sequence is non-related to the sequence of the key segments in the key, so that compared to the second exemplary embodiment, the related contents of the key segments are appeared on the data bus in a more irregular manner. Therefore, the situation that the hacker easily obtains the content of the key by directly probing the data bus or measuring the energy variation is avoided.

Figure 10:
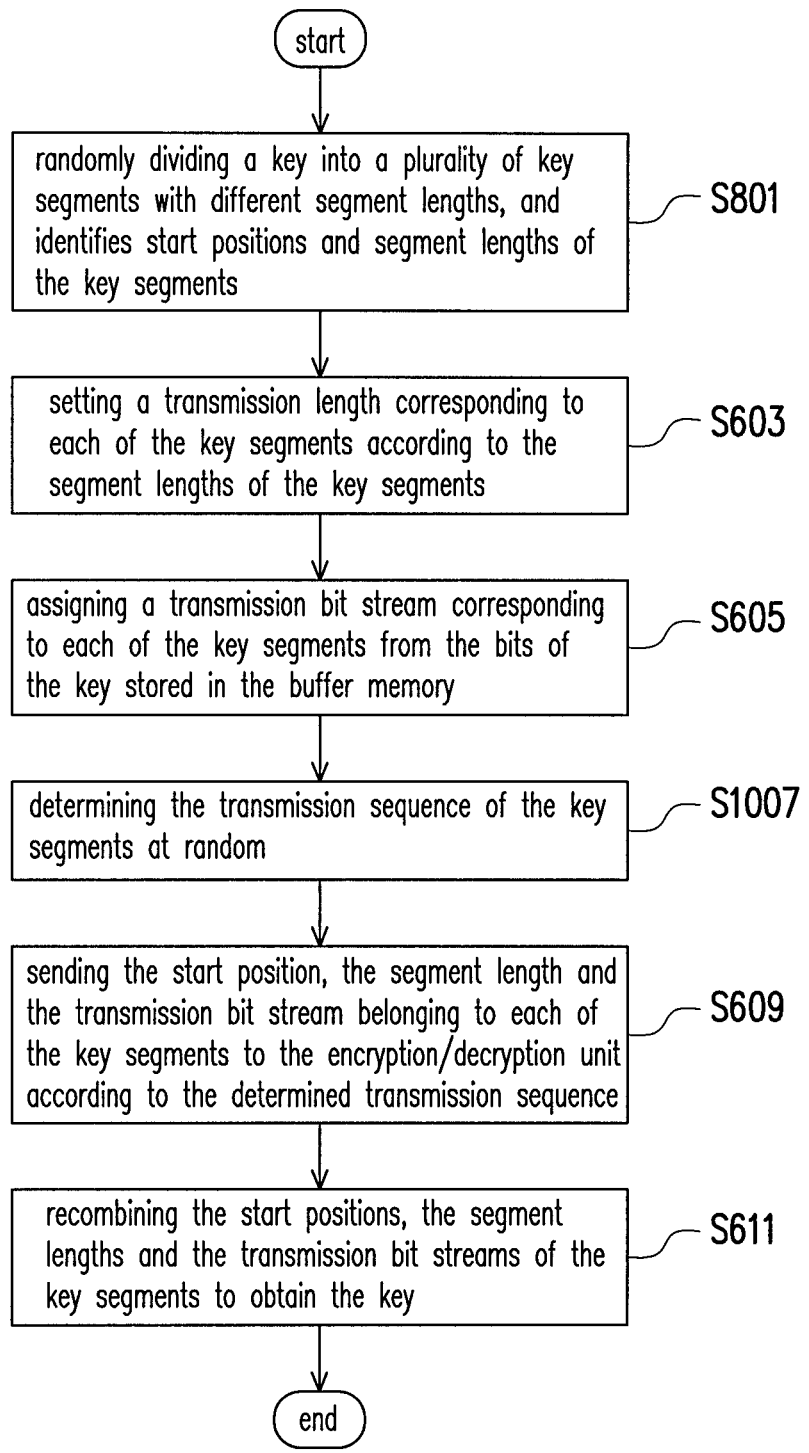
FIG. 10 is a flowchart illustrating a key transport method according to the third exemplary embodiment of the present invention.

FIG. 10 is a flowchart illustrating a key transport method according to the third exemplary embodiment of the invention.

Referring to FIG. 10, besides the step S1007, the other steps have been described in the second and the third exemplary embodiments, which are not repeated herein, and only the step S1007 is described below.

In the step S1007, the memory management circuit 202 determines the transmission sequence of the key segments at random. For example, in the present exemplary embodiment, the memory management circuit 202 first generates four random numbers (for example, 3, 1, 4 and 2) for the key segments 901-904, and then transmits the key segments 901-904 according to the sequence shown by the random numbers. Namely, the memory management circuit 202 first transmits the key segment 902, and then transmits the key segment 904, the key segment 901 and the key segment 903.

It should be noticed that although the a plurality of bits of the key are randomly divided into a plurality of key segments with different segment lengths in the third exemplary embodiment, the present invention is not limited thereto, and in another exemplary embodiment, the a plurality of bits of the key can also be logically divided into a plurality of key segments with the same segment length. Thereafter, the transmission bit streams of the key segments are transmitted according to a transmission sequence determined at random.

Fourth Exemplary Embodiment

A memory controller and a memory storage apparatus of the fourth exemplary embodiment of the present invention are substantially the same to the memory controller and the memory storage apparatus of the third exemplary embodiment, and a difference between the two embodiments is that in the fourth exemplary embodiment, a different method is used to set the transmission length of each of the key segments. To be specific, in the fourth exemplary embodiment, the transmission length of each of the key segments is set at random, and the transmission length of each key segment is not less than the segment length of the key segment. Therefore, besides that each key segment has an unfixed segment length, the transmission bit streams of the key segments can be overlapped. Particularly, in the first to the third exemplary embodiments, each bit of the key is only input once, though in the fourth exemplary embodiment, a part of the content of the key can be input twice or more. In this way, difficulty in side channel attack is greatly increased, so that the hacker is harder to obtain the content of the key by directly probing the data bus or measuring the energy variation. The difference of the fourth exemplary embodiment and the third exemplary embodiment is described below with reference to FIGS. 11A-11C.

FIG. 11A is a schematic diagram of a key transport method according to the fourth exemplary embodiment of the present invention, FIG. 11B is a schematic diagram of determining transmission lengths of key segments shown in FIG. 11A, and FIG. 11C is a related information list of a plurality of key segments obtained by logically dividing a key shown in FIG. 11A.

Referring to FIGS. 11A-11C, as described above, similar to the third exemplary embodiment, in the fourth exemplary embodiment, the key is logically divided into four key segments, and the transmission sequence of the key segments is determined, and details thereof are not repeated. A difference between the two embodiments is that in the fourth exemplary embodiment, the transmission lengths of the key segments 1151-1154 are set at random.

In the present exemplary embodiment, the memory management circuit 202 sets a transmission length of a key segment (which is not the last key segment) according to a following equation (1):

$$L(i)=\text{rand}(P(i+1)-P(i),N-P(i)) \quad (1)$$

Wherein, L(i) is a transmission length of an $i^{th}$ key segment, rand(a, b) is a random function used for producing a random integer between an integer 'a' and an integer 'b', P(i) is a start position of the $i^{th}$ key segment, P(i+1) is a start position of an $(i+1)^{th}$ key segment, and N is the number of bits of the key.

In the present exemplary embodiment, the memory management circuit 202 calculates a transmission length of the last key segment according to a following equation (2):

$$L(m)=N-P(m)+1 \quad (2)$$

Wherein, m is a total number of the key segments, L(m) is a transmission length of the $m^{th}$ key segment (the last key segment), P(m) is a start position of the $m^{th}$ key segment, and N is the number of bits of the key.

Namely, the transmission length corresponding to each of the key segments is set at random according to the above equation (1) and (2), and the transmission length of any of the key segments is greater than or equal to the segment length of the key segment, and is not greater than a difference between the length of the key and the start position of the key segment plus 1 (i.e. (P(i+1)−P(i)<=L(i)<=(N−P(i)+1)).

For example, in the present exemplary embodiment, N is 16, m is 4, P(1) is 1, P(2) is 6, P(3) is 9, and P(4) is 15. According to the equation (1), L(1) is a random integer between 5 and 15 (i.e. L(1)=rand(6-1, 16-1)=rand(5, 15)). Similarly, L(2) is a random integer between 3 and 10 (i.e. L(2)=rand(9-6, 16-6)=rand(3, 10)), and L(3) is a random integer between 6 and 7 (i.e. L(3)=rand(15-9, 16-9)=rand(6, 7)). According to the equation (2), L(4) is 2 (i.e. L(4)=16−15+1=2). Particularly, according to FIG. 11B, in the present exemplary embodiment, based on calculations of the random function of the equation (1) and the equation (2), the transmission length L1 (i.e. L(1)) is 7, the transmission length L2 (i.e. L(2)) is 6, the transmission length L3 (i.e. L(3)) is 7, and the transmission length L4 (i.e. L(4)) is 2. However, it should be noticed that the transmission lengths L1-L3 are random values generated by the random function, which are not fixed values.

After the transmission lengths of the key segments are set, the memory management circuit 202 assigns a transmission bit stream of each of the key segments from the key 252a in the buffer memory 252 according to the start positions and the transmission lengths of the key segments. In detail, the memory management circuit 202 reads seven bit values (i.e., '1010100') from the start position of the key segment 1151 to serve as the transmission bit stream of the key segment 1151, reads six bit values (i.e., '000010') from the start position of the key segment 1152 to serve as the transmission bit stream of the key segment 1152, reads seven bit values (i.e., '0101011') from the start position of the key segment 1153 to serve as the transmission bit stream of the key segment 1153, and reads two bit values (i.e., '11') from the start position of the key segment 1154 to serve as the transmission bit stream of the key segment 1154 (shown in the fifth column of FIG. 11C).

Then, the memory management circuit 202 determines a transmission sequence of the key segments according to the same method as that in the third exemplary embodiment, and accordingly transmits the start positions, the segment lengths and the transmission bit streams of the key segments.

According to the key transport method of the fourth exemplary embodiment, not only the segment lengths of the key segments are random values, but also the transmission sequence is non-related to the sequence of the key segments in the key. Meanwhile, the transmission length of each key segment is also a random value, and is not less than the segment lengths of the key segment. In this way, the contents of the key segments are randomly overlapped, and energy information of key transport is further disrupted. Therefore, compared to the third exemplary embodiment, the related contents of the key segments are appeared on the data bus in a more irregular and overlapped manner. Therefore, a situation that the hacker easily obtains the content of the key by directly probing the data bus or measuring the energy variation is avoided.

It should be noticed that in the present exemplary embodiment, the equations (1) and (2) are used to determine the random transmission lengths of the key segments, though the present invention is not limited thereto, and as long as the transmission length of each of the key segment is not less than the segment length of the key segment, and is not greater than the length of the key, in another embodiment of the present invention, other random methods can also be used to determine the random transmission lengths of the key segments.

Figure 12:
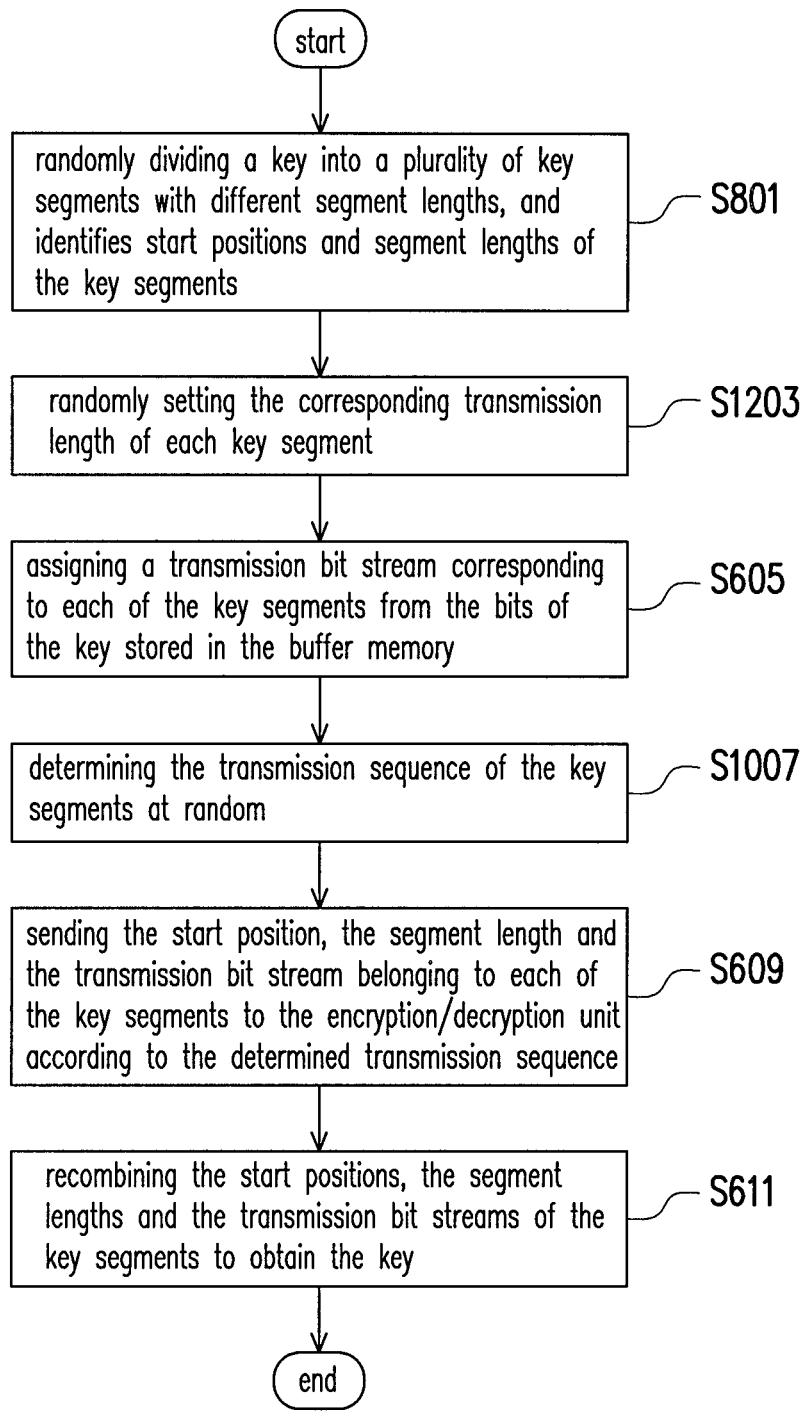
FIG. 12 is a flowchart of a key transport method according to the fourth exemplary embodiment of the present invention.

FIG. 12 is a flowchart of a key transport method according to the fourth exemplary embodiment of the invention.

Referring to FIG. 12, besides the step S1203, the other steps have been described in the first to the third exemplary embodiments, which are not repeated herein, and only the step S1203 is described below.

In the step S1203, the memory management circuit 202 randomly sets the corresponding transmission length of each key segment. For example, the memory management circuit 202 first determines whether a key segment to be set is the last key segment, and if not, the memory management circuit 202 sets the transmission length corresponding to the key segment according to the aforementioned equation (1). If the key segment is the last key segment, the memory management circuit 202 sets the transmission length corresponding to the key segment according to the aforementioned equation (2).

It should be noticed that in the fourth exemplary embodiment, although the a plurality of bits of the key are also randomly divided into a plurality of key segments with different segment lengths, and the transmission sequence of the key segments is determined at random, and the transmission lengths of the key segments are determined at random, the present invention is not limited thereto.

For example, in another exemplary embodiment, the a plurality of bits of the key may also be logically divided into a plurality of key segments with the same segment length, and the transmission sequence of the key segments is determined by an arranging sequence of the key segments, and the transmission lengths of the key segments are determined at random.

For another example, in another exemplary embodiment, the a plurality of bits of the key can be logically divided into a plurality of key segments with the same segment length, and the transmission sequence of the key segments is determined at random, and the transmission lengths of the key segments are determined at random.

For still another example, in another exemplary embodiment, the a plurality of bits of the key may be logically divided into a plurality of key segments with different segment lengths, and the transmission sequence of the key segments is determined by an arranging sequence of the key segments, and the transmission lengths of the key segments are determined at random.

Fifth Exemplary Embodiment

A memory controller and a memory storage apparatus of the fifth exemplary embodiment of the present invention are substantially the same to the memory controller and the memory storage apparatus of the fourth exemplary embodiment, and in the fifth exemplary embodiment, the method similar to that described in the fourth exemplary embodiment is used to determine the transmission lengths of the key segments, wherein a difference between the two embodiments is that in the fifth exemplary embodiment, at least one dummy key is joined behind the real key. Therefore, besides the overlapped key contents, each key segment further includes an additional content of the dummy key. In this way, difficulty in side channel attack is greatly increased, so that the hacker is harder to obtain the content of the key by directly probing the data bus or measuring the energy variation.

FIG. 13A is a schematic diagram of a key transport method according to the fifth exemplary embodiment of the present invention, FIG. 13B is a schematic diagram of determining transmission lengths of key segments according to FIG. 13A, and FIG. 13C is a related information list of a plurality of key segments obtained by logically dividing a key shown in FIG. 13A.

Referring to FIGS. 13A-13C, as described above, similar to the fourth exemplary embodiment, in the fifth exemplary embodiment, the key is logically divided into four key segments, and the transmission sequence of the key segments is determined, and details thereof are not repeated. A difference between the two embodiments is that in the fifth exemplary embodiment, although the memory management circuit 202 sets the transmission lengths of the key segments 1351-1354 at random, the memory management circuit 202 further joins at least one dummy key behind the real key, and sends contents of at least a part of the dummy key and the real key together.

For simplicity's sake, in the present exemplary embodiment, it is assumed that the dummy key 252b temporarily stored in the buffer memory 252 only includes 8 bits (with a content shown in FIG. 13A), and is joined behind the real key 252a.

In the present exemplary embodiment, the memory management circuit 202 sets a transmission length of a key segment (which is not the last key segment) according to a following equation (3):

$$L(i)=\text{rand}(P(i+1)-P(i), N+S-P(i)) \qquad (3)$$

Where, $L(i)$ is a transmission length of an $i^{th}$ key segment, $\text{rand}(a, b)$ is a random function used for producing a random integer between an integer 'a' and an integer 'b', $P(i)$ is a start position of the $i^{th}$ key segment, $P(i+1)$ is a start position of an $(i+1)$th key segment, N is the number of bits of the key, and S is a sum of lengths of all dummy keys.

In the present exemplary embodiment, the memory management circuit 202 calculates a transmission length of the last key segment according to a following equation (4):

$$L(m)=N+S-P(m)+1 \qquad (4)$$

Wherein, m is a total number of the key segments, $L(m)$ is a transmission length of the $m^{th}$ key segment (the last key segment), $P(m)$ is a start position of the $m^{th}$ key segment, N is the number of bits of the key, and S is a sum of lengths of all dummy keys.

Namely, the transmission length corresponding to each of the key segments is set at random according to the above equation (3) and (4), and the transmission length of any of the key segments is greater than or equal to the segment length of the key segment, and is not greater than a difference between a sum of lengths of the key and the dummy keys and the start position of the key segment plus 1 (i.e. $(P(i+1)-P(i))<=L(i)<=(N+S-P(i)+1)$).

For example, in the present exemplary embodiment, N is 16, S is 8, m is 4, P(1) is 1, P(2) is 6, P(3) is 9, and P(4) is 15. According to the equation (3), L(1) is a random integer between 5 and 24 (i.e. $L(1)=\text{rand}(6-1, 16+8-1)=\text{rand}(5, 24)$). Similarly, L(2) is a random integer between 3 and 18 (i.e. $L(2)=\text{rand}(9-6, 16+8-6)=\text{rand}(3, 18)$), and L(3) is a random integer between 6 and 15 (i.e. $L(3)=\text{rand}(15-9, 16+8-9)=\text{rand}(6, 15)$). According to the equation (4), L(4) is 10 (i.e. $L(4)=16+8-15+1=10$). Particularly, according to FIG. 13B, in the present exemplary embodiment, based on calculations of the random function of the equation (3) and the equation (4), the transmission length L1 (i.e. L(1)) is 9, the transmission length L2 (i.e. L(2)) is 7, the transmission length L3 (i.e. L(3)) is 11, and the transmission length L4 (i.e. L(4)) is 10.

After the transmission lengths of the key segments are set, the memory management circuit 202 assigns a transmission bit stream of each of the key segments from the key 252a in the buffer memory 252 according to the start positions and the transmission lengths of the key segments. In detail, the memory management circuit 202 reads nine bit values (i.e., '101010000') from the start position of the key segment 1351 to serve as the transmission bit stream of the key segment 1351, reads seven bit values (i.e., '0000101') from the start position of the key segment 1352 to serve as the transmission bit stream of the key segment 1352, reads eleven bit values (i.e., '01010111100') from the start position of the key segment 1353 to serve as the transmission bit stream of the key segment 1353, and reads ten bit values (i.e., '1110010101') from the start position of the key segment 1354 to serve as the transmission bit stream of the key segment 1354 (shown in the fifth column of FIG. 13C).

Then, the memory management circuit 202 determines a transmission sequence of the key segments according to the same method as that in the fourth exemplary embodiment, and accordingly transmits the start positions, the segment lengths and the transmission bit streams of the key segments.

Figure 14:
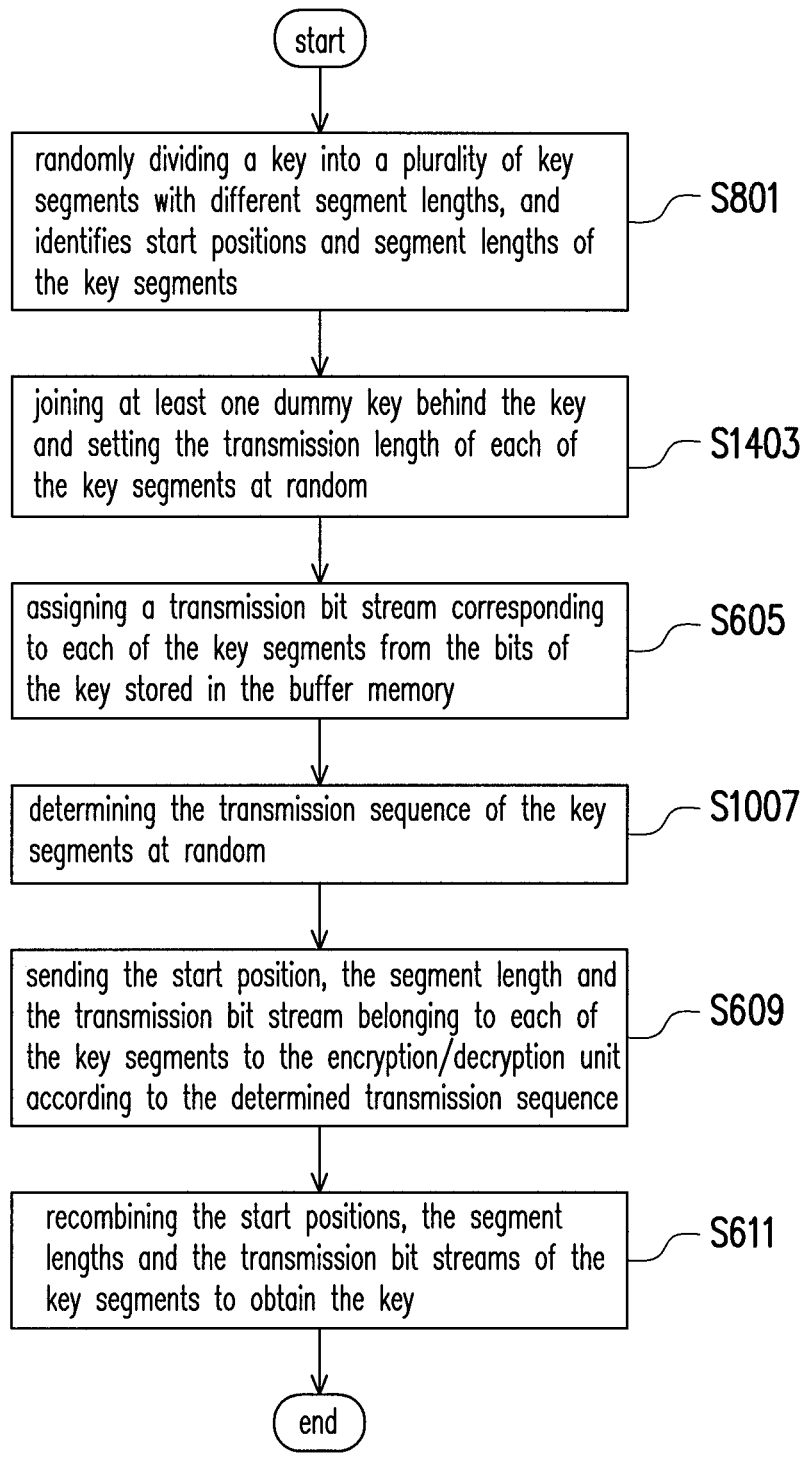
FIG. 14 is a flowchart of a key transport method according to the fifth exemplary embodiment of the present invention.

Referring to FIG. 14, besides the step S1403, the other steps have been described in the first to the third exemplary embodiments, which are not repeated herein, and only the step S1403 is described below.

In the step S1403, the memory management circuit 202 joins at least one dummy key behind the key and sets the transmission length of each of the key segments at random.

According to the key transport method of the present exemplary embodiment, the transmission bit stream of each key segment randomly contains the content of the dummy key. In this way, the energy information of key transport is further disrupted. Therefore, compared to the fourth exemplary embodiment, the related contents of the key segments are appeared on the data bus in a more irregular manner. Therefore, a situation that the hacker easily obtains the content of the key by directly probing the data bus or measuring the energy variation is avoided.

It should be noticed that in the present exemplary embodiment, the equations (3) and (4) are used to determine the random transmission lengths of the key segments, though the present invention is not limited thereto, and as long as the transmission length of each of the key segment is not less than the segment length of the key segment, and is not greater than the length of the key and the dummy key, in another exemplary embodiment, other random methods can also be used to determine the random transmission lengths of the key segments.

It should be noticed that in the fifth exemplary embodiment, although the a plurality of bits of the key are also randomly divided into a plurality of key segments with different segment lengths, and the transmission sequence of the key segments is determined at random, and the transmission lengths of the key segments are determined at random, the invention is not limited thereto. For example, in another exemplary embodiment, the a plurality of bits of the key may also be logically divided into a plurality of key segments with the same segment length, or the transmission sequence of the key segments is determined by an arranging sequence of the key segments, or the transmission lengths of the key segments are set to a fixed length.

In summary, according to the key transport method, the memory controller and the memory storage apparatus of the exemplary embodiment, the key is not uninterruptedly appeared on the data bus during transmission, so that a situation that the hacker easily obtains the content of the key by directly probing the data bus or measuring energy variation can be avoided. Therefore, safety in key transport is effectively improved, and data in the memory storage apparatus is well protected. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A key transport method, for transporting a key stored in a buffer memory to an encryption/decryption unit through a data bus, the key transport method comprising:

logically dividing a plurality of bits of the key into a plurality of key segments, wherein each of the key segments has a start position and a segment length;

setting a transmission length corresponding to each of the key segments according to the segment lengths of the key segments;

assigning a transmission bit stream belonging to each of the key segments from the bits of the key according to the start positions and the transmission lengths of the key segments;

determining a transmission sequence of the key segments; and sending the start position, the segment length and the transmission bit stream belonging to each of the key segments from the buffer memory to the encryption/decryption unit through the data bus according to the transmission sequence.

2. The key transport method as claimed in claim 1, wherein the step of logically dividing the bits of the key into the key segments comprises:

equally dividing the bits of the key into the key segments, wherein the segment lengths of the key segments are the same and the transmission lengths of the key segments are the same to the segment lengths of the key segments.

3. The key transport method as claimed in claim 1, wherein the step of logically dividing the bits of the key into the key segments comprises:

randomly dividing the bits of the key into the key segments, wherein the segment lengths of at least two of the key segments are different.

4. The key transport method as claimed in claim 1, wherein the step of determining the transmission sequence of the key segments comprises determining the transmission sequence at random.

5. The key transport method as claimed in claim 1, wherein the step of setting the transmission length corresponding to each of the key segments according to the segment lengths of the key segments comprises:

setting the transmission length corresponding to each of the key segments at random according to a length of the key and the segment lengths of the key segments.

6. The key transport method as claimed in claim 1, further comprising:

joining at least one dummy key behind the key, wherein the step of setting the transmission length corresponding to each of the key segments according to the segment lengths of the key segments comprises:

setting the transmission length corresponding to each of the key segments at random according to a length of the key, a length of the at least one dummy key and the segment lengths of the key segments.

7. The key transport method as claimed in claim 1, further comprising:

recombining the start positions, the segment lengths and the transmission bit streams belonging to the key segments in the encryption/decryption unit to obtain the key.

8. The key transport method as claimed in claim 7, wherein the encryption/decryption unit has a start position register, a segment length register, a transmission bit stream register and a key register, wherein the step of sending the start position, the segment length and the transmission bit stream belonging to each of the key segments from the buffer memory to the encryption/decryption unit through the data bus according to the transmission sequence comprises:

sending the start positions belonging to the key segments to the start position register through the data bus;

sending the segment lengths belonging to the key segments to the segment length register through the data bus; and sending the transmission bit streams belonging to the key segments to the transmission bit stream register through the data bus.

9. The key transport method as claimed in claim 8, wherein the step of recombining the start positions, the segment lengths and the transmission bit streams belonging to the key segments in the encryption/decryption unit to obtain the key comprises:

respectively reading the start positions, the segment lengths and the transmission bit streams belonging to the key segments from the start position register, the segment length register, the transmission bit stream register on the encryption/decryption unit, obtaining the key according to the start positions, the segment lengths and the transmission bit streams belonging to the key segments, and writing the obtained key into the key register.

10. A memory controller, for controlling a rewritable non-volatile memory module, the memory controller comprising:

a host interface, configured to couple to a host system;
a memory interface, configured to couple to the rewritable non-volatile memory module;
a buffer memory, configured to temporarily store a key;
an encryption/decryption circuit, configured to encrypt or decrypt data according to the key; and
a memory management circuit, coupled to the host interface and the memory interface, and configured for transporting the key from the buffer memory to the encryption/decryption circuit through a data bus,
wherein the memory management circuit logically divides a plurality of bits of the key into a plurality of key segments, wherein each of the key segments has a start position and a segment length,
wherein the memory management circuit sets a transmission length corresponding to each of the key segments according to the segment lengths of the key segments,
wherein the memory management circuit assigns a transmission bit stream belonging to each of the key segments from the bits of the key according to the start positions and the transmission lengths of the key segments,
wherein the memory management circuit determines a transmission sequence of the key segments, and sends the start position, the segment length and the transmission bit stream belonging to each of the key segments from the buffer memory to the encryption/decryption circuit through the data bus according to the transmission sequence.

11. The memory controller as claimed in claim 10, wherein the memory management circuit equally divides the bits of the key into the key segments, wherein the segment lengths of the key segments are the same and the transmission lengths of the key segments are the same to the segment lengths of the key segments.

12. The memory controller as claimed in claim 10, wherein the memory management circuit randomly divides the bits of the key into the key segments, wherein the segment lengths of at least two of the key segments are different.

13. The memory controller as claimed in claim 10, wherein the memory management circuit determines the transmission sequence at random.

14. The memory controller as claimed in claim 10, wherein the memory management circuit sets the transmission length corresponding to each of the key segments at random according to a length of the key and the segment lengths of the key segments.

15. The memory controller as claimed in claim 10, wherein the memory management circuit joins at least one dummy key behind the key, and sets the transmission length corresponding to each of the key segments at random according to a length of the key, a length of the at least one dummy key and the segment lengths of the key segments.

16. The memory controller as claimed in claim 10, wherein the encryption/decryption circuit recombines the start positions, the segment lengths and the transmission bit streams belonging to the key segments to obtain the key.

17. The memory controller as claimed in claim 16, wherein the encryption/decryption circuit has a start position register, a segment length register, a transmission bit stream register and a key register, wherein the memory management circuit sends the start positions belonging to the key segments to the start position register through the data bus, sends the segment lengths belonging to the key segments to the segment length register through the data bus, and sends the transmission bit streams belonging to the key segments to the transmission bit stream register through the data bus.

18. The memory controller as claimed in claim 17, wherein the encryption/decryption circuit comprises an encryption/decryption controller, wherein the encryption/decryption controller respectively reads the start positions, the segment lengths and the transmission bit streams belonging to the key segments from the start position register, the segment length register and the transmission bit stream register, obtains the key according to the start positions, the segment lengths and the transmission bit streams belonging to the key segments, and writes the obtained key into the key register.

19. A memory storage apparatus, comprising:

a connector, configured to couple to a host system;
a rewritable non-volatile memory module, configured to store data; and
a memory controller, coupled to the connector and the rewritable non-volatile memory module, and comprising:
a host interface, coupled to the connector;
a memory interface, coupled to the rewritable non-volatile memory module;
a buffer memory, configured to temporarily store a key;
an encryption/decryption circuit, configured to encrypt or decrypt data according to the key; and
a memory management circuit, coupled to the host interface and the memory interface, and configured for transporting the key from the buffer memory to the encryption/decryption circuit through a data bus,
wherein the memory management circuit logically divides a plurality of bits of the key into a plurality of key segments, wherein each of the key segments has a start position and a segment length,
wherein the memory management circuit sets a transmission length corresponding to each of the key segments according to the segment lengths of the key segments,
wherein the memory management circuit assigns a transmission bit stream belonging to each of the key segments from the bits of the key according to the start positions and the transmission lengths of the key segments,
wherein the memory management circuit determines a transmission sequence of the key segments, and sends the start position, the segment length and the transmission bit stream belonging to each of the key segments from the buffer memory to the encryption/decryption circuit through the data bus according to the transmission sequence.

20. The memory storage apparatus as claimed in claim 19, wherein the memory management circuit randomly divides the bits of the key into the key segments, wherein the segment lengths of at least two of the key segments are different.

21. The memory storage apparatus as claimed in claim 19, wherein the memory management circuit determines the transmission sequence at random.

22. The memory storage apparatus as claimed in claim 19, wherein the memory management circuit sets the transmission length corresponding to each of the key segments at random according to a length of the key and the segment lengths of the key segments.

23. The memory storage apparatus as claimed in claim 19, wherein the memory management circuit joins at least one dummy key behind the key, and sets the transmission length corresponding to each of the key segments at random according to a length of the key, a length of the at least one dummy key and the segment lengths of the key segments.

24. The memory storage apparatus as claimed in claim 19, wherein the encryption/decryption circuit has a start position register, a segment length register, a transmission bit stream register and a key register, wherein the memory management circuit sends the start positions belonging to the key segments to the start position register through the data bus, sends the segment lengths belonging to the key segments to the segment length register through the data bus, and sends the transmission bit streams belonging to the key segments to the transmission bit stream register through the data bus.

25. The memory storage apparatus as claimed in claim 24, wherein the encryption/decryption circuit comprises an encryption/decryption controller, wherein the encryption/decryption controller respectively reads the start positions, the segment lengths and the transmission bit streams belonging to the key segments from the start position register, the segment length register and the transmission bit stream register, obtains the key according to the start positions, the segment lengths and the transmission bit streams belonging to the key segments, and writes the obtained key into the key register.

* * * * *